(12) United States Patent  
Yamagami

(10) Patent No.: US 7,581,007 B2  
(45) Date of Patent: Aug. 25, 2009

(54) METHOD, APPARATUS AND SERVICES FOR LEASING VOLUMES

(75) Inventor: Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 709 days.

(21) Appl. No.: 10/387,311

(22) Filed: Mar. 11, 2003

(65) Prior Publication Data

US 2004/0181600 A1    Sep. 16, 2004

(51) Int. Cl.
*G06F 15/173*    (2006.01)
*G06F 15/16*    (2006.01)
*G06F 21/00*    (2006.01)

(52) U.S. Cl. .................... 709/226; 709/203; 705/52

(58) Field of Classification Search .......... 709/203, 709/216, 226, 229; 705/52
See application file for complete search history.

(56) References Cited

U.S. PATENT DOCUMENTS

| | | | |
|---|---|---|---|
| 5,771,354 | A | 6/1998 | Crawford |
| 6,281,894 | B1 | 8/2001 | Rive |
| 6,330,653 | B1 | 12/2001 | Murray et al. |
| 6,351,776 | B1 | 2/2002 | O'Brien et al. |
| 6,895,461 | B1 * | 5/2005 | Thompson .................. 710/305 |
| 7,058,696 | B1 * | 6/2006 | Phillips et al. .............. 709/217 |
| 2002/0095547 | A1 | 7/2002 | Watanabe et al. |
| 2002/0133539 | A1 * | 9/2002 | Monday ...................... 709/203 |
| 2002/0156612 | A1 * | 10/2002 | Schulter et al. ............... 703/23 |
| 2003/0037187 | A1 * | 2/2003 | Hinton et al. .................. 710/1 |
| 2003/0055972 | A1 * | 3/2003 | Fuller et al. ................. 709/226 |
| 2003/0084209 | A1 * | 5/2003 | Chadalapaka .................. 710/5 |
| 2003/0101239 | A1 * | 5/2003 | Ishizaki ...................... 709/219 |
| 2003/0212752 | A1 * | 11/2003 | Thunquest et al. ........... 709/213 |

FOREIGN PATENT DOCUMENTS

EP    1235156 A1    8/2002

OTHER PUBLICATIONS

Gibbons, K. et al. (2002). "Internet Storage Name Service (iSNS)," from draft-ietf-ips-isns-12.txt, IPS Internet Draft, pp. 1-89.
Hitachi Freedom Storage Software Solutions Guide, Hitachi Data Systems, pp. 1-92.
Satran, J. et al. (2002). "iSCSI," from draft-ietf-ips-iscsi-17.txt, IPS Internet Draft, pp. 1-285.
Voruganti, K. et al. (2002), "iSCSI Naming and Discovery," from draft-ietf-ips-iscsi-name-disc-06.txt, IPS Working Group Internet Draft, pp. 1-20.
Xdrive Technologies- "Online Storage Solutions," from <http://www.xdrive.com/index.jsp> visited on Oct. 1, 2002.

* cited by examiner

*Primary Examiner*—William C Vaughn, Jr.
*Assistant Examiner*—Ranodhi N Serrao
(74) *Attorney, Agent, or Firm*—Mattingly & Malur, P.C.

(57) ABSTRACT

A method, apparatus, article of manufacture, and system are presented for providing a data storage service. An apparatus according to one embodiment of the invention includes a first server coupled to a network and adapted to receive a request for storage from a client computer via the network, and a storage system coupled to the network and adapted to provide a data storage area corresponding to the request for storage, wherein the first server is further adapted to transmit access information associated with the storage area to the client computer, wherein the storage system is further adapted to directly receive an I/O command from the client program for at least one operation relating to the storage area.

16 Claims, 7 Drawing Sheets

| User ID | iSCSI Name | User Name | Storage Subsystem ID | Capacity |
|---|---|---|---|---|
| 000001 | ISCSI0001 | Kenji.Yamagami000 | SS-00-001 | 16GB |
| | ISCSI0002 | Kenji.Yamagami001 | SS-00-001 | |
| 000002 | ISCSI0003 | Takashi.Amano000 | SS-00-001 | 10GB |
| 000003 | ISCSI0004 | Akira.Kagami0000 | SS-00-002 | 20GB |

Fig. 2

METHOD, APPARATUS AND SERVICES FOR LEASING VOLUMES

BACKGROUND OF THE INVENTION

This invention is generally related to the field of data storage services.

Data storage services provided over the Internet has the potential of bringing dramatically improved data storage capabilities to a wide range of new users. Generally, a data storage service allows a user to utilize an assigned portion of data storage within a storage system maintained by the data storage service. Such an arrangement may allow an individual or enterprise to obtain access to data storage of increased performance and reliability without having to acquire and maintain complex storage systems such as storage area networks (SANs) implementing various redundant array of independent disks (RAID) techniques. Such systems provide superior data storage reliability and performance, but often require a significant cost in terms of initial investment and upkeep. Thus, a data storage service may provide important data storage options that may otherwise be out of the reach of many users. Furthermore, a data storage service may allow efficient data storage that is geographically remote from the user's premises, which provides opportunities for increased reliability, especially in the protection of data from location-based failures. Also, a data storage service provided over the Internet potentially allows a user the opportunity to control stored data from any location in the world where access to the Internet is available, thereby increasing the flexibility of data storage.

However, these and other advantages have yet to be fully realized by existing data storage services provided over the Internet. Typically, such services support only a few high-level file operations, which the user must specify through a web browser/server environment. For example, a user may only be able to select from a few file operations such as read, write, move, copy, or delete, by making the selection on a web browser. The user's selection is sent over the Internet from the user's web browser to the data storage service's web server. The web server or other equipment and software operated by the data storage service recognizes the user's selection and performs steps that eventually produce the lower-level commands required to control the data storage system on which the user's data storage area resides. Generally, this process is based on proprietary software implemented by the data storage service. Such indirect, high-level control of files precludes the user's computer from treating the data storage area as if it existed on a readily accessible storage device. For example, the user cannot format the data storage area as a logical volume of storage, construct a file system based on such a logical volume, create a disk group based on such a logical volume, or implement a software RAID using the data storage area. Furthermore, the user is dependent on intermediate equipment and software, such as a web browser, for obtaining access to the data storage area. These significant limitations prevent currently existing data storage services from offering service-based data storage that truly resembles disk space on readily-accessible storage devices.

BRIEF SUMMARY OF THE INVENTION

The present invention presents a method, apparatus, article of manufacture, and system for providing a data storage service. An apparatus according to one embodiment of the invention includes a first server coupled to a network and adapted to receive a request for storage from a client computer via the network, and a storage system coupled to the network and adapted to provide a data storage area corresponding to the request for storage, wherein the first server is further adapted to transmit access information associated with the storage area to the client computer, wherein the storage system is further adapted to directly receive an I/O command from the client program for at least one operation relating to the storage area.

According to one embodiment wherein the network is an Internet Protocol (IP) network and wherein the access information includes a name associated with the data storage area, the apparatus further involves a second server coupled to the network and adapted to register mapping information between the name and an IP address associated with the data storage area, wherein the second server is further adapted to receive the name from the client computer and transmit the IP address to the client computer. According to another embodiment wherein the network is an Internet Protocol (IP) network, the access information includes an IP address associated with the data storage area.

The storage system may be adapted to receive the I/O command using an iSCSI-based protocol. Further, the storage area may be organized as at least one logical volume implemented in the storage system. Also, a file system may be created on the data storage area.

Through various embodiments, the present invention allows a client computer to directly access a data storage area provided by a data storage service. For example, a user can format the data storage area as a logical volume of storage, construct a file system based on such a logical volume, create a disk group based on such a logical volume, and/or implement a software RAID using the data storage area. Furthermore, the user needs not depend on intermediate equipment and software, such as a web browser, for obtaining access to the data storage area.

A further understanding of the nature and advantages of the present invention may be realized by reference to the remaining portions of the specification and the drawings.

BRIEF DESCRIPTION OF THE DRAWINGS

FIG. 2 is an illustrative table of information maintained by an accounting server shown in FIG. 1.

DETAILED DESCRIPTION OF THE INVENTION

Configuration Overview

Figure 1:
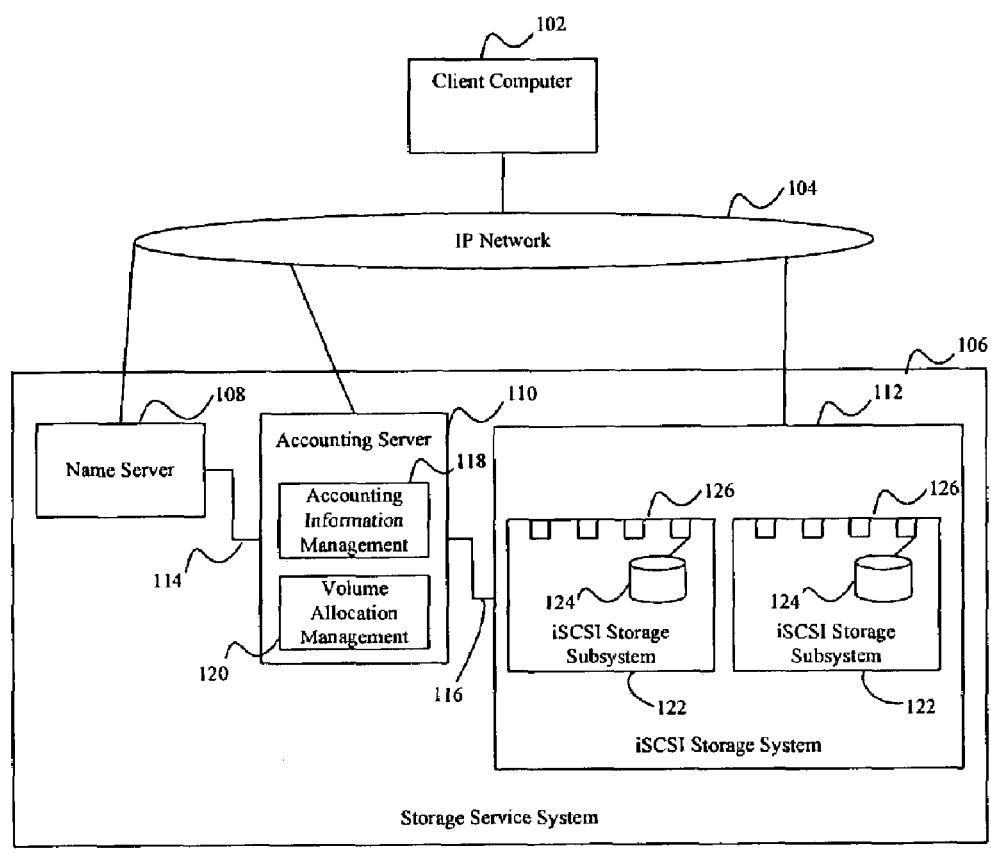
FIG. 1 is a block diagram of an overall configuration for providing data storage service in accordance with one embodiment of the present invention.

FIG. 1 is a block diagram of an overall configuration 100 for providing data storage service in accordance with one embodiment of the present invention. As shown, configuration 100 includes a client computer 102 coupled to an Internet Protocol (IP) network 104. The client computer 102 utilizes a storage service system 106 via the IP network 104. Here, the storage service system comprises a name server 108, an accounting server 110, and an Internet Small Computer System Interface (iSCSI) storage system 112, each coupled to the IP network 104. The client computer 102 may access the name server 108, accounting server 110, and iSCSI storage system 112 through the IP network 104. Also, these three components of the storage service system 106 may communicate with one another through the IP network 106 or through more direct connections such as optional links 114 and 116.

The client computer 102 may be any computer a user of the data storage service utilizes to access the storage service system 106. For example, the client computer 102 may be a PC, a Mac, or a work station type computer. The client computer 102 may be based on any operating system capable of implementing such access, such as a Windows, Mac, or UNIX operating system. A user of the client computer 102 may be an individual or an enterprise who may use the client computer 102 in a business, home, or other setting. Further, the client computer 102 may be a stand-alone computer or a computer that is a part of a larger system of computers.

The user may utilize the client computer 102 to access the accounting server 110 through the IP network 104, in order to establish an account, review account information, or perform other account-related activities. By establishing an account, a user may obtain access to use one or more data storage areas in the storage service system 106. The IP network 104 shown in FIG. 1 is presented for purposes of illustration. A specific example of the IP network 106 is the Internet. Accordingly, the user may access the accounting server 110 by using a web browser at the client computer 102 to communicate with a web server at the accounting server 110. However, other types of public or proprietary networks may also be used in accordance with the present invention.

Accounting Server

The accounting server 110 keeps track of users of the storage service system 106 and their assigned data storage areas within the iSCSI storage system 112. The accounting server 110 may incorporate both functions of accounting information management 118 and volume allocation management 120. Accounting information management 118 relates to the maintenance of user account information, such as incurred charges, user profile information, and other information relating to each user of the data storage service. Volume allocation management 120 relates to the maintenance of storage area assignment for each user.

FIG. 2 is an illustrative table 200 of information maintained by accounting server 110. Table 200 includes the following categories of information: User ID 202, iSCSI Name 204, User Name 206, Storage Subsystem ID 208, and Capacity 210. User ID 202 is a label for identifying different users of the storage service system 106. As shown, User ID 202 is expressed as a numerical label, but a label based on any alpha-numeric name may be used. Here, an alpha-numeric name refers to a name based on text, numbers, characters, other symbols, or a combination of the above. iSCSI Name 204 is a label for identifying a specific data storage area mapped as an iSCSI targets implemented in a particular iSCSI storage subsystem within the iSCSI storage system 112. iSCSI targets and iSCSI storage subsystems are discussed in more detail below in relation to the iSCSI storage system 112. User Name 206 provides an additional label associated with each identified storage area. Storage Subsystem ID 208 identifies the specific iSCSI storage subsystem in which each identified storage area is implemented. Finally, Capacity 210, identifies the total amount of data storage provided by storage areas assigned to a particular user.

As shown in table 200, each user identified in the table may be assigned one or more data storage areas. For example, User ID 202 of value "000001" identifies a user who has been assigned two such storage areas: (1) "ISCSI0001," which is labeled with user name "Kenji.Yamagami000" and is implemented in the "SS-00-001" storage subsystem and (2) "ISCS10002," which is labeled with user name "Kenji.Yamagami0001" and is also implemented in the "SS-0-001" storage subsystem. These two storage areas have a combined capacity of 16 gigabytes (GB), and they are both assigned to the user identified as "000001" under User ID 202. While a total capacity value is shown here for each user identified under User ID 202, an indication of capacity of each individual storage area may also be maintained.

The account server 110 may use the information in table 200 to calculate charges incurred for each user. Generally, such charges are determined on the basis of considerations such as capacity, reliability, and performance of storage areas used. Capacity information 210 for various storage areas is indicated in table 200. Reliability and performance information for various storage areas may be determined by the account server 110. For example, the account server 110 may keep an internal record, or communicate with the iSCSI storage system 112, to determine the RAID level associated each identified storage area identified in table 200. Such a RAID level may be an indication of the reliability and performance of the associated storage area. By keeping track of such information, the account server 110 maintains an account for each user who utilizes the storage service system 106.

iSCSI Storage System

Referring back to FIG. 1, the iSCSI storage system 112 implements the actual data storage areas provided to users of the storage service system 106. In accordance with at least one embodiment of the present invention, the client computer 102 accesses such data storage areas by communicating with the iSCSI storage system 112, over the IP network 104, using the iSCSI protocol. The iSCSI protocol is an encapsulated I/O device communication protocol. The iSCSI protocol encapsulates Small Computer Interface System (SCSI) commands within the structure of the Transmission Control Protocol (TCP) protocol. As such, the iSCSI protocol enables control of I/O devices using SCSI type communication, including data and device-level control signals, conducted over a packet-based network, such as an IP network. An iSCSI target is a construct within the iSCSI protocol that refers to an endpoint of an iSCSI interconnection. Each iSCSI target may be comprised of one or more logical units. While the iSCSI protocol is discussed here for purposes of illustration, other encapsulated I/O device communication protocols, such as the Fibre Channel over IP (FCIP) protocol, may be used in accordance with another embodiment of the invention. As mentioned previously, the IP network 104 is discussed here for purposes of illustration, as well. Other types of public or proprietary networks may also be used.

According to the present embodiment of the invention, each storage area made available to users of the storage service system 106 may be organized as a logical volume 124 implemented within one of the iSCSI storage subsystems 122 in the iSCSI storage system 112 of FIG. 1. One or more such logical volumes 124 may be mapped as an iSCSI target or a logical unit within an iSCSI target. Each such iSCSI target may be identified by an iSCSI ID, and each such logical unit may be identified by a logical unit number (LUN). Further, the logical volumes may be accessed as iSCSI targets or iSCSI logical units through designated IP ports and IP addresses. Examples of such IP ports include IP ports 126 shown in FIG. 1. By organizing storage areas as logical volumes associated with iSCSI IDs and LUNs, and by use of corresponding IP ports and IP addresses, specific storage areas implemented in the storage service system 106 can be efficiently accessed through the IP network 104. While IP addresses are discussed here, Uniform Resource Locators (URLs), or other types of addresses may also be used in accordance with the present invention. Although not shown in FIG. 1, the storage service system may employ networking equipment such as switches and routers to facilitate the proper flow of packet-based network traffic between various devices.

Figure 3:
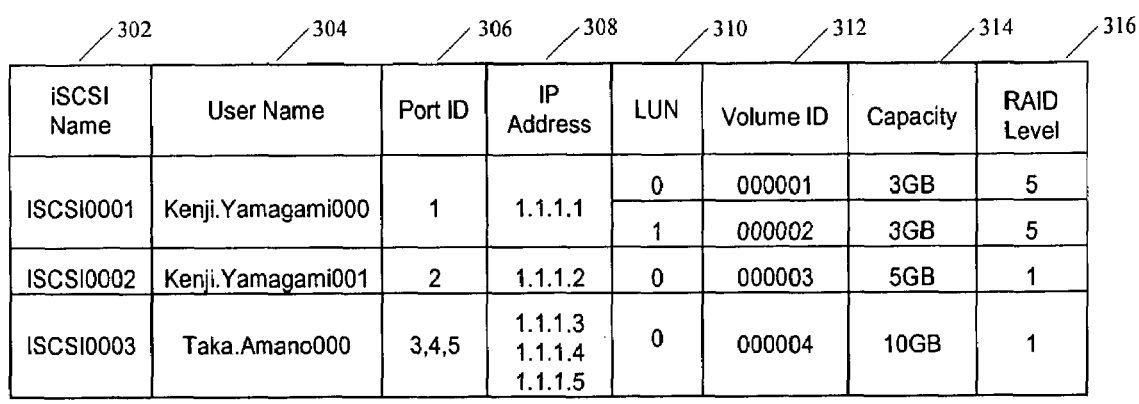
FIG. 3 is an illustrative table of information maintained by one of the iSCSI storage subsystems shown in FIG. 1.

FIG. 3 is an illustrative table 300 of information maintained by one of the iSCSI storage subsystems 122. The table 300 includes the following categories of information: iSCSI Name 302, User Name 304, Port ID 306, IP address 308, Volume ID 312, Capacity 314, and RAID Level 316. iSCSI Name 302 and User Name 304 may correspond to iSCSI Name 204 and User Name 206 in table 200. Specifically, iSCSI Name 302 refers to an iSCSI target. Port ID 306 identifies one or more IP ports through which the identified iSCSI target may be accessed. Table 300 indicates that more than one IP port may be designated for use in accessing a single iSCSI target. Such use of multiple IP ports may provide redundancy or load-balancing in handling IP traffic. While not shown in table 300, more than one iSCSI targets may also be accessed through a single IP port. This may be required when the number of IP ports is limited. IP address 308 indicates the unique IP addresses that may be assigned to iSCSI targets. LUN 310 identifies the specific logic unit within the iSCSI target that is being mapped to a particular logical volume within the iSCSI subsystem. Volume ID identifies the associated logical volume. Capacity 314 indicates the size of the storage space corresponding to the identified logical volume. RAID Level 316 identifies the type, or level, of RAID used to implement the identified logical volume.

Name Server

Referring again to FIG. 1, the name server 108 provides a naming service that translates an iSCSI name into a corresponding IP address utilized to access a data storage area within the iSCSI storage system 112. As discussed previously, according to at least one embodiment of the present invention, the client computer 102 may access a desired logical volume of data storage by referring to the IP address associated with the logical volume. However, an IP address is typically composed of a concatenated set numbers that is difficult to remember or use as a reference. It may be more convenient for a user to refer to a data storage area, such as a logical volume, by using an alpha-numeric name, instead of an IP address.

In accordance with one embodiment of the present invention, a user attempting to access a logical volume may simply specify an alpha-numeric name associated with the IP address identifying the logical volume. The client computer 102 utilized by the user may pass the alpha-numeric name to the name server 108. In response, the name server 108 may provide the associated IP address identifying the logical volume back to the client computer 102. In this manner, the user may obtain the correct IP address for accessing the desired logical volume. Examples of such a convenient alpha-numeric name may include the iSCSI name 204 and 302 and the user name 206 and 304. If the user can simply use the appropriate IP address and does not require the use of an alpha-numeric name, the name server 108 may not be needed. Thus, while FIG. 1 shows the name server 108 as a part of the storage service system 106, the name server 108 may be omitted in other embodiments of the present invention.

FIG. 1 shows the name server 108, accounting server 110, and iSCSI storage system 112 as separate devices. However, both the name server 108 and accounting server 110 may be implemented in software, and thus can be realized in any computer system capable of supporting their functionalities. As such, the name server 108 and the storage system 112 may be implemented in a single computer system, in accordance with another embodiment of the present invention. In fact, the name server 110 and the storage system 112 may even be implemented in the computer system of the iSCSI storage system 112, in yet another embodiment of the present invention. In that case, the name server 108, accounting server 110, and iSCSI storage system 112 would be implemented using a common computer system.

Sequence Diagrams—Establishing and Accessing Storage Areas

Figure 4A:
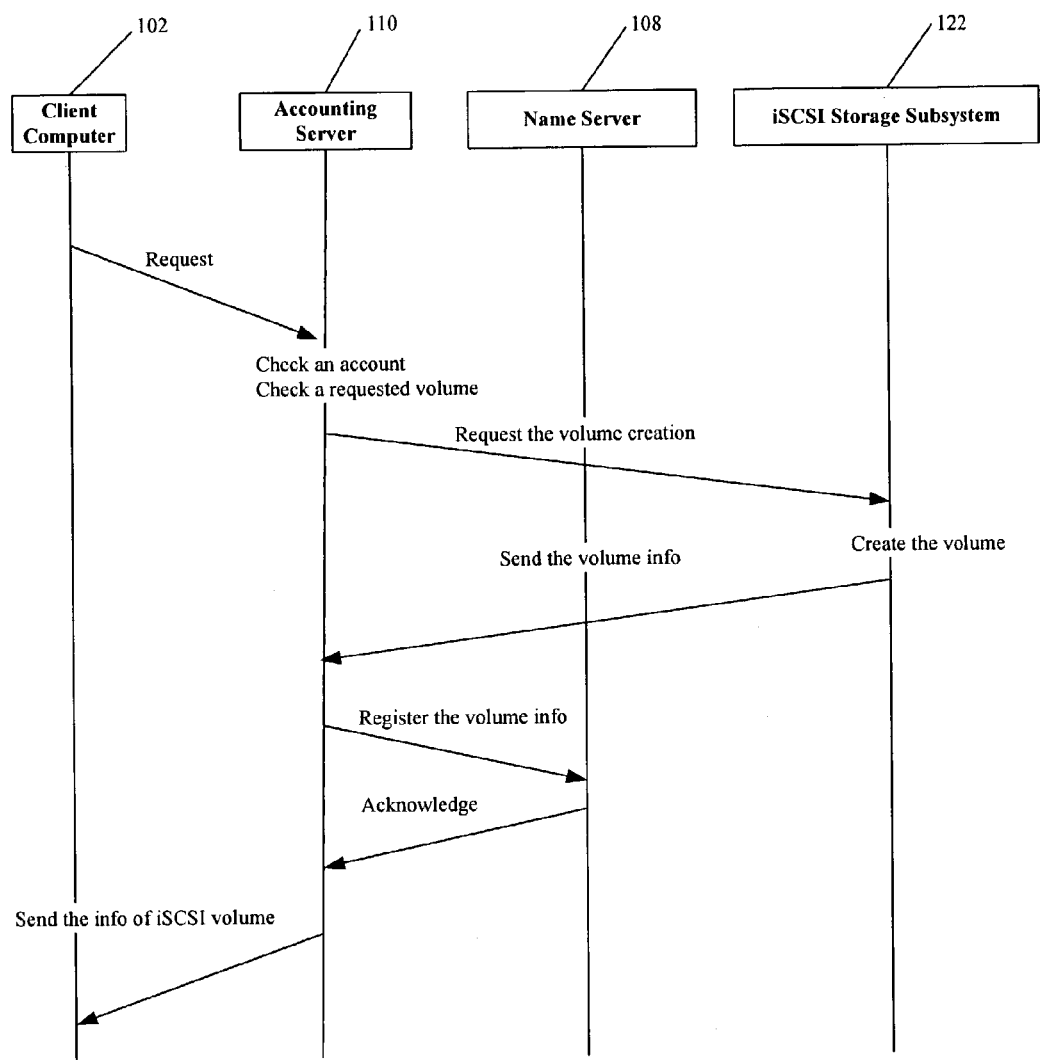
FIG. 4A is a sequence diagram outlining the process of establishing a logical volume referenced by an iSCSI name, in accordance with one embodiment of the present invention.

FIG. 4A is a sequence diagram outlining the process of establishing a logical volume referenced by an iSCSI name, in accordance with one embodiment of the present invention. As shown in FIG. 4A, the client computer 102 sends a request for establishing a logical volume to the accounting server 110. The accounting server 110 may check an account to see if the user already has account and the status of such an account. For example, if the user already has an account, and the user's account is in arrears or is otherwise not qualified to establish a new logical volume, the accounting server 110 may reject the request. If the user does not already have an account, a new account may be created. Further, the accounting server 110 may check a requested volume to see if the requested volume may already exist or is otherwise incapable of being established. If after such checks, the accounting server 110 may determine that the request for establishing a volume should be processed. In that case, the accounting server 110 sends a request for volume creation to the iSCSI storage subsystem 122.

In response, the iSCSI storage subsystem 122 creates the requested logical volume. The process of creating the requested logical volume may involve a number of steps such as those illustrated below:

a) Create an iSCSI target in accordance with the iSCSI protocol if an appropriate iSCSI target does not exist;
b) Assign an iSCSI name, such an iSCSI name 204 or 302, to the iSCSI target;
c) Assign an address, such as an IP address 308, to the iSCSI target;
d) Assign a port, such as an IP port 126, to the iSCSI target;
e) Assign a user name, such a user name 206, to the iSCSI target;
f) Create an appropriate logical volume; and
g) Assign the logical volume to the iSCSI target.

Next, the iSCSI storage subsystem 122 sends information relating to the newly created logical volume to the accounting server 110. For example, this information may include the iSCSI name associated with the logical volume, as well as the IP address associated with the logical volume. The accounting server 110 registers the logical volume information with the name server 108. Such registration allows the name server 108 to obtain a mapping between the iSCSI name and the IP address associated with the logical volume. Since the iSCSI name can be an alpha-numeric name, it may be more easily remembered or referred to by the user than the IP address. Thus, the name server 108 may be utilized to provide a translation between the iSCSI name and the IP address as a convenience for the user.

Next, the name server 108 sends an acknowledge to the accounting server 110 if the volume information has been properly registered at the name server 108. The accounting server 110 then sends information relating to the newly-created logical volume to the client computer 102. Specifically, this information may include the iSCSI name, so that the client computer may use the iSCSI name to refer to the logical volume created. While the iSCSI name is used as an example here to discuss FIG. 4A, other alpha-numeric names may also be used.

Figure 4B:
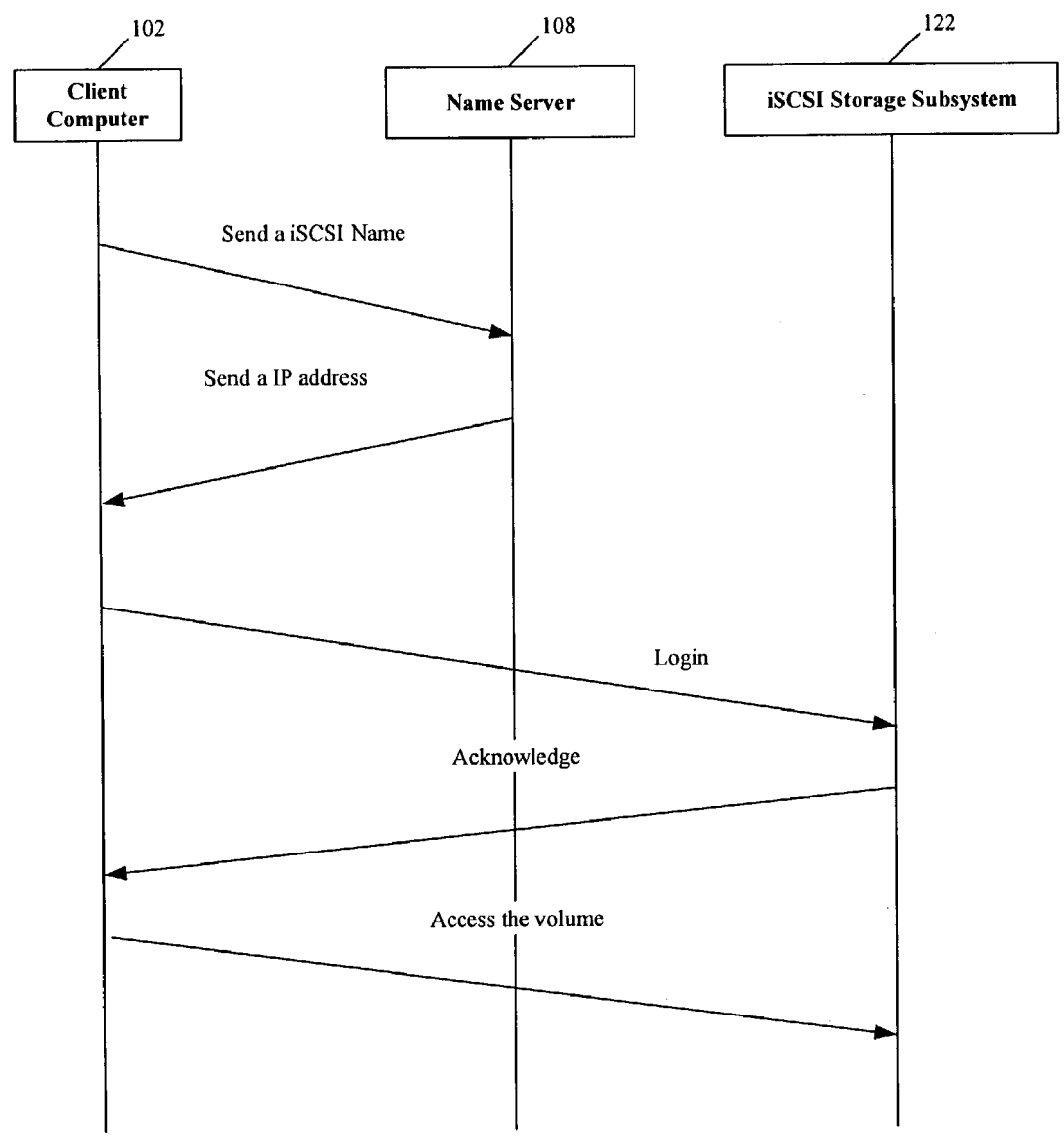
FIG. 4B is a sequence diagram outlining the process of accessing a logical volume referenced by an iSCSI name, after such a logical volume has been established through a process such as that shown in FIG. 4A.

FIG. 4B is a sequence diagram outlining the process of accessing a logical volume referenced by an iSCSI name, after such a logical volume has been established through a process such as that shown in FIG. 4A. As shown in FIG. 4B, the client computer 102 sends an iSCSI name associated with a particular logical volume to the name server 108. In response, the iSCSI server translates the iSCSI name into a corresponding IP address and sends the IP address back to the client computer 102. Next, the client computer 102 conducts a login process with the iSCSI storage subsystem 122. This login process may require the client computer 102 to provide authentication information in order to verify that the client computer 102 or a user using the client computer 102 should be given access to particular areas of storage, such as a specific logical volume, within the storage subsystem 122. In the login process, the client computer 102 may indicate the IP address received from the name server 108, in order to identify a specific logical volume of interest. If the login process is successful, the iSCSI storage subsystem 122 sends an acknowledge to the client computer 102 to indicate that access to the logical volume is allowed. If the login process is unsuccessful, the iSCSI storage subsystem 122 may send a message to the client computer 102 to indicate that such access is denied. After a successful login, the client computer 102 may proceed to access the logical volume of interest. During such access, the client computer may use the IP address received from the name server 108 to identify the logical volume of interest. In the present embodiment, such access may involve direct transmission of input/output (I/O) commands between the client computer 102 and the iSCSI storage subsystem 122 to achieve desired operations relating to the logical volume of interest. While the iSCSI name is used as an example here to discuss FIG. 4B, other alpha-numeric names may also be used.

Figure 5A:
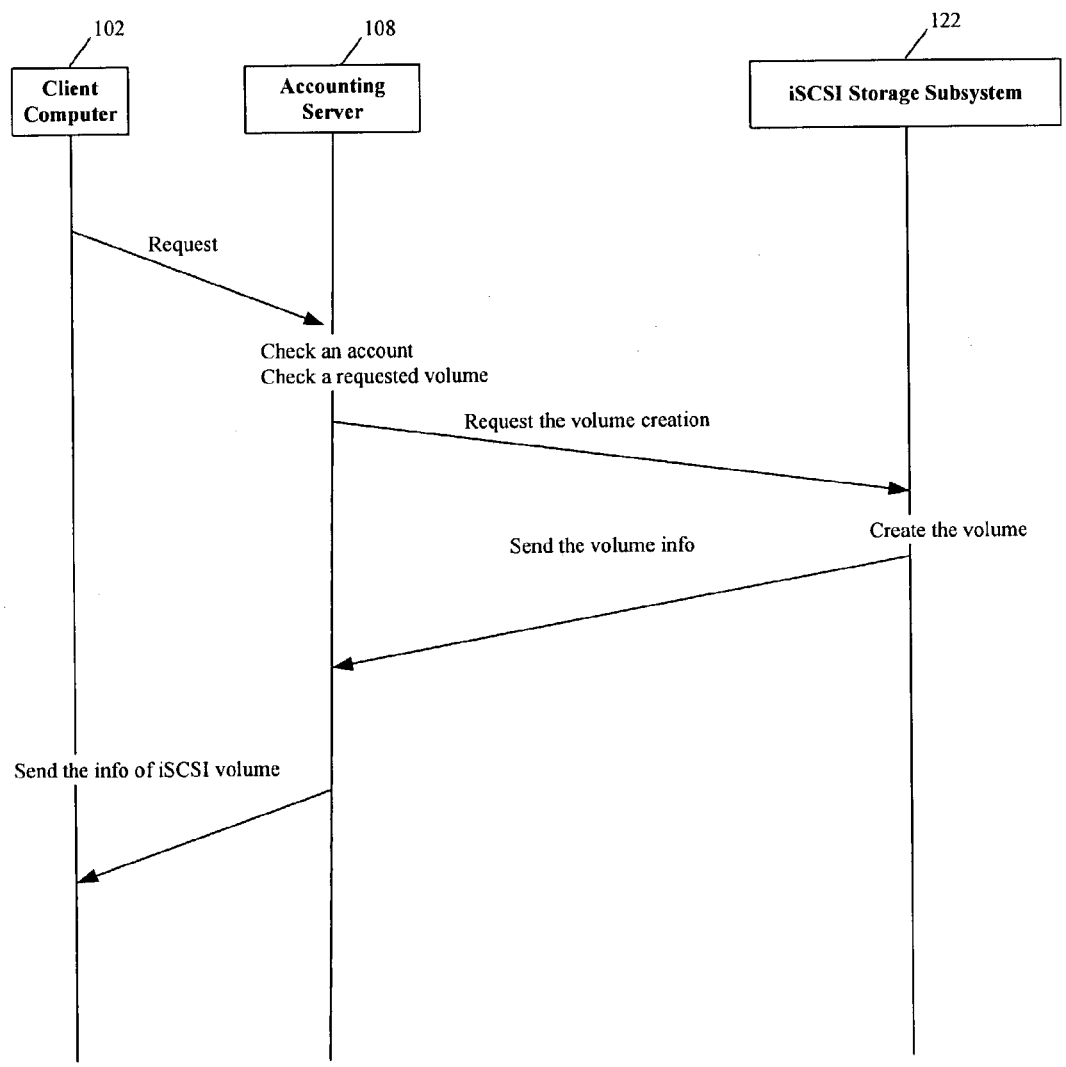
FIG. 5A is a sequence diagram outlining the process of establishing a logical volume referenced by an IP address, in accordance with another embodiment of the present invention.

FIG. 5A is a sequence diagram outlining the process of establishing a logical volume referenced by an IP address, in accordance with another embodiment of the present invention. As shown in FIG. 5A, the client computer 102 sends a request for establishing a logical volume to the accounting server 110. The accounting server 110 may check an account to see if the user already has account and the status of such an account. Further, the accounting server 110 may check a requested volume to see if the requested volume may already exist or is otherwise incapable of being established. These checks are similar to those described previously in relation to FIG. 4A. If after the checks, the accounting server 110 may determine that the request for establishing a volume should be processed.

In that case, the accounting server 110 sends a request for volume creation to the iSCSI storage subsystem 122. In response, the iSCSI storage subsystem 122 creates the requested logical volume, which may involve steps previously discussed in relation to FIG. 4A. Next, the iSCSI storage subsystem 122 sends information relating to the newly created logical volume to the accounting server 110. For example, this information may include the IP address associated with the logical volume. Next, the accounting server 110 sends information relating to the newly created logical volume to the client computer 102. Specifically, this information may include the associated IP address, so that the client computer may use the IP address to refer to the logical volume.

Figure 5B:
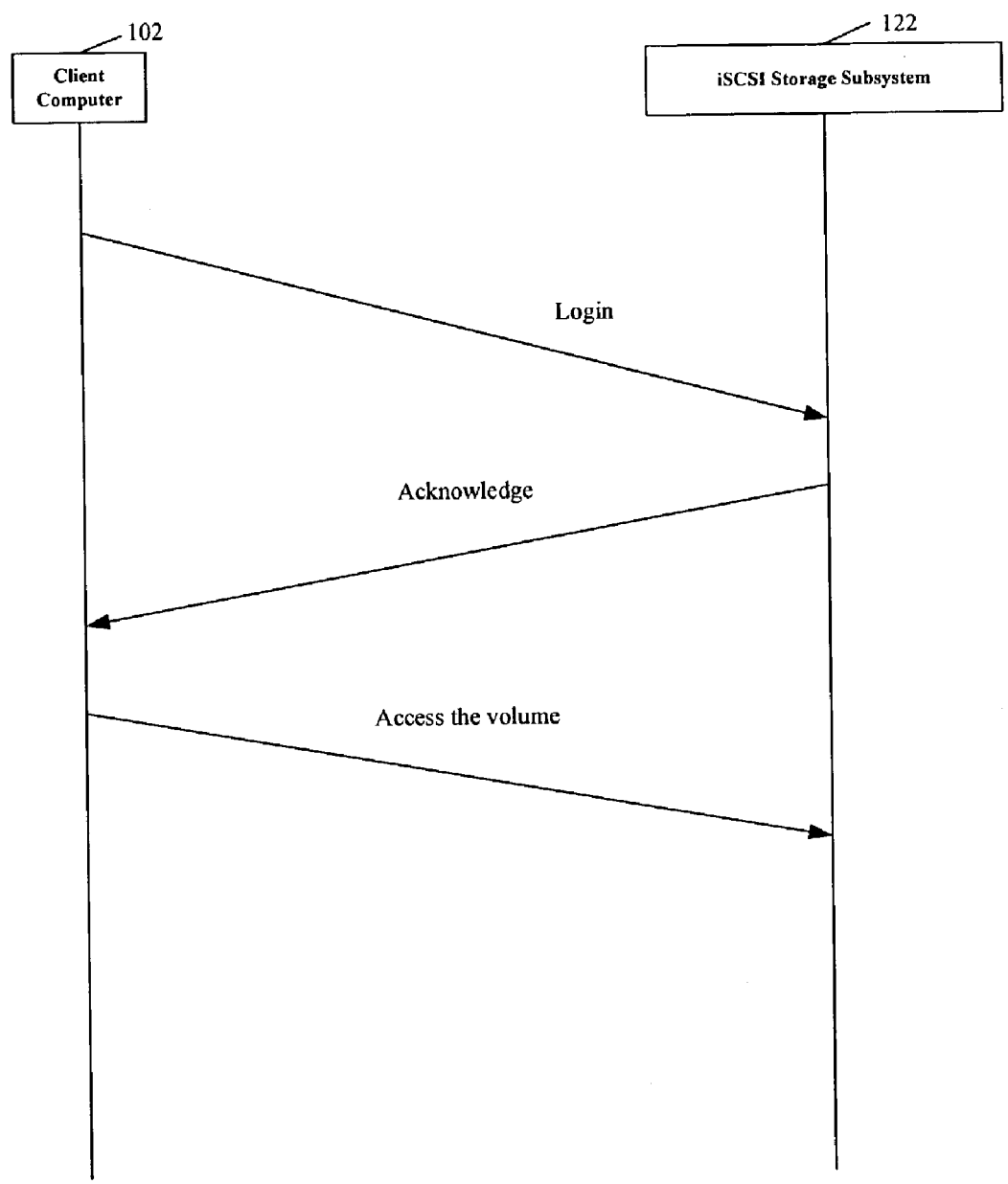
FIG. 5B is a sequence diagram outlining the process of accessing a logical volume referenced by an ip address, after such a logical volume has been established through a process such as that shown in FIG. 5A.

FIG. 5B is a sequence diagram outlining the process of accessing a logical volume referenced by an IP address, after such a logical volume has been established through a process such as that shown in FIG. 5A. As shown in FIG. 5B, the client computer 102 conducts a login process with the iSCSI storage subsystem 122. This login process may require the client computer 102 to provide authentication information in order to verify that the client computer 102 or a user using the client computer 102 should be given access to particular areas of storage, such as a specific logical volume, within the storage subsystem 122. In the login process, the client computer 102 may indicate the IP address associated with a logical volume of interest. If the login process is successful, the iSCSI storage subsystem 122 sends an acknowledge to the client computer 102 to indicate that access to the logical volume is allowed. If the login process is unsuccessful, the iSCSI storage subsystem 122 may send a message to the client computer 102 to indicate that such access is denied. After a successful login, the client computer 102 may proceed to access the logical volume of interest. During such access, the client computer may use the IP address to identify the logical volume of interest. In the present embodiment, such access may involve direct transmission of I/O commands between the client computer 102 and the iSCSI storage subsystem 122 to achieve desired operations relating to the logical volume of interest.

Although the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. An apparatus for providing data storage service comprising:
    a first server coupled to a network and adapted to receive a request for storage from a client computer via the network, wherein the first server includes a processor and a memory unit;
    a storage system coupled to the network and adapted to provide data storage to the client computer;
    wherein the first server maintains accounting information for a plurality of customers leasing storage capacity at the data storage service and determines if a customer account associated with the request for storage is in arrears based upon the accounting information before processing the request for storage;
    wherein the accounting information includes incurred charges, and is used by the first server to calculate charges incurred for each customer and to maintain account for each customer,
    wherein the first server determines whether a data storage area corresponding to the request for storage is available at the storage system and, wherein if the data storage area is not available, the first server sends a create request to the storage system to create the data storage area if the customer account is not in arrears, but does not send the create request if the customer account is in arrears, and wherein if the data storage area is available, the first server does not send the create request, wherein the request for storage is rejected if the first server determines that the customer account associated with the request for storage is in arrears based upon the accounting information, and the request for storage is accepted if the first server determines that the customer account associated with the request for storage is not in arrears based upon the accounting information, and wherein if the customer account is not established, a new customer account is created, and if the customer account is established, no new customer account is created, wherein the storage system communicates information about the data storage area, including access information for the data storage area, to the first server;

wherein the first server transmits the access information for the data storage area to the client computer, the access information enabling the client computer to communicate directly with the storage system; and wherein the storage system receives I/O commands for reading data from and writing data to the data storage area directly from the client computer.

2. The apparatus of claim 1 wherein the network is an Internet Protocol (IP) network, wherein the access information includes a name associated with the data storage area, the apparatus further comprising:

a second server coupled to the network and adapted to register mapping information between the name and an IP address associated with the data storage area;

wherein the second server is further adapted to receive the name from the client computer and transmit the IP address to the client computer.

3. The apparatus of claim 1 wherein the network is an Internet Protocol (IP) network, wherein the access information includes an IP address associated with the data storage area.

4. The apparatus of claim 1 wherein the network is an Internet Protocol (IP) network, wherein the storage system is adapted to receive the I/O command using an iSCSI-based protocol.

5. The apparatus of claim 1 wherein the data storage area is organized as at least one logical volume implemented in the storage system.

6. The apparatus of claim 1 wherein a file system is created on the data storage area.

7. The apparatus of claim 1 wherein the first server calculates charges incurred for each customer based on at least one of capacity, reliability, and performance of storage areas used.

8. The apparatus of claim 7 wherein the first server calculates charges incurred for each customer based on at least one of the reliability and performance of storage areas used, and the first server determines the reliability and performance of the storage areas used.

9. A method for providing a data storage service comprising:

receiving, at a first server coupled to a network, a request for storage from a client computer via the network;

determining the status of an account corresponding to the request for storage based upon accounting information maintained at the first server before processing the request for storage, wherein the accounting information includes incurred charges, wherein the first server maintains the accounting information for a plurality of customers leasing storage capacity at the data storage service;

creating, at the first server, the account corresponding to the request for storage if it is determined that the account corresponding to the request for storage does not already exist, wherein the first server does not create the account if the account already exists;

sending a create request to a storage system coupled to the network to create a data storage area corresponding to the request for storage if the status indicates that the account corresponding to the request for storage is not in arrears;

rejecting the request for storage if the status indicates that the account corresponding to the request for storage is in arrears;

using the accounting information by the first server to calculate charges incurred for each customer and to maintain account for each customer, receiving information associated with the data storage area, including access information, from the storage system at the first server;

transmitting the access information from the first server to the client computer, wherein the access information enables the client computer to communicate directly with the storage system; and directly receiving, at the storage system, communication from the client computer specifying I/O commands from the client computer for reading data from and writing data to the data storage area.

10. The method of claim 9 wherein the network is an Internet Protocol (IP) network, wherein the access information includes a name associated with the data storage area, the method further comprising:

registering, at a second server, mapping information between the name and an IP address associated with the data storage area;

receiving, at the second server, the name from the client computer; and transmitting the IP address from the second server to the client computer.

11. The method of claim 9 wherein the network is an Internet Protocol (IP) network, wherein the access information includes an IP address associated with the data storage area.

12. The method of claim 9 wherein the network is an Internet Protocol (IP) network, wherein the storage system receives the I/O command using an iSCSI-based protocol.

13. The method of claim 9 wherein the data storage area is organized as at least one logical volume implemented in the storage system.

14. The method of claim 9 further comprising a step for creating a file system on the data storage area.

15. The method of claim 9 wherein the first server calculates charges incurred for each customer based on at least one of capacity, reliability, and performance of storage areas used.

16. The method of claim 15 wherein the first server calculates charges incurred for each customer based on at least one of the reliability and performance of storage areas used, and further comprising determining, by the first server, the reliability and performance of the storage areas used.

* * * * *